US012739518B2

(12) United States Patent
Lee et al.

(10) Patent No.: US 12,739,518 B2
(45) Date of Patent: Sep. 15, 2026

(54) DISPLAY DEVICE AND METHOD FOR OPERATING DISPLAY DEVICE

(71) Applicant: Samsung Electronics Co., Ltd., Suwon-si (KR)

(72) Inventors: Changwoo Lee, Suwon-si (KR); Jiyoung Kwak, Suwon-si (KR); Hyeryoung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 47 days.

(21) Appl. No.: 19/045,224

(22) Filed: Feb. 4, 2025

(65) Prior Publication Data

US 2025/0343995 A1 Nov. 6, 2025

Related U.S. Application Data

(63) Continuation of application No. PCT/KR2025/000932, filed on Jan. 16, 2025.

(30) Foreign Application Priority Data

May 3, 2024 (KR) ........................ 10-2024-0058860

(51) Int. Cl.
*H04N 23/74* (2023.01)
*H04N 23/56* (2023.01)
(Continued)

(52) U.S. Cl.
CPC ............. *H04N 23/74* (2023.01); *H04N 23/56* (2023.01); *H04N 23/63* (2023.01); *H04N 23/71* (2023.01); *H04N 23/743* (2023.01); *H04N 23/88* (2023.01)

(58) Field of Classification Search
CPC ........ H04N 23/56; H04N 23/63; H04N 23/71; H04N 23/74; H04N 23/743; H04N 23/88
See application file for complete search history.

(56) References Cited

U.S. PATENT DOCUMENTS 8,698,916 B2 4/2014 Steinberg et al.
8,885,074 B2 11/2014 Steinberg et al.
(Continued)

FOREIGN PATENT DOCUMENTS

CN 105554391 A * 5/2016 ........... H04N 23/611
CN 108965730 12/2018
(Continued)

OTHER PUBLICATIONS

Machine Translation of CN105554391 A to Liang et al., included with the foreign reference. (Year: 2016).*
(Continued)

*Primary Examiner* — Daniel M Pasiewicz
(74) *Attorney, Agent, or Firm* — Nixon & Vanderhye, P.C.

(57) ABSTRACT

A display device according to an embodiment of the disclosure may: obtain a first image which is a target image and a second image captured through the at least one camera, extract a common component between the first image and the second image, split a first area including the common component in the first image into a plurality of first sub areas and identify an attribute value associated with at least one of a color or a brightness corresponding to each of the plurality of first sub areas as a per-first sub area attribute value, split a second area including the common component in the second image into a plurality of second sub areas and identify an attribute value associated with at least one of a color or a brightness corresponding to each of the plurality of second sub areas as a per-second sub area attribute value, identify that a difference between at least one first attribute value corresponding to at least one third sub area among the plurality of first sub areas and at least one second attribute value corresponding to at least one fourth sub area among the plurality of second sub areas is not within a specified
(Continued)

range, and based on the at least one first attribute value, determine a setting value of controlling the at least one light associated with the at least one fourth sub area among the plurality of lights.

20 Claims, 16 Drawing Sheets

(51) Int. Cl.

| | |
|---|---|
| ***H04N 23/63*** | (2023.01) |
| ***H04N 23/71*** | (2023.01) |
| ***H04N 23/743*** | (2023.01) |
| ***H04N 23/88*** | (2023.01) |

(56) References Cited

U.S. PATENT DOCUMENTS

| | | | | |
|---|---|---|---|---|
| 9,672,650 | B2 | 6/2017 | Kondo | |
| 10,313,603 | B2 | 6/2019 | Chang et al. | |
| 10,395,098 | B2 | 8/2019 | Hwang et al. | |
| 10,497,257 | B2 | 12/2019 | Sohn et al. | |
| 11,055,989 | B2 | 7/2021 | Sohn et al. | |
| 2006/0039690 | A1 | 2/2006 | Steinberg et al. | |
| 2008/0279424 | A1 | 11/2008 | Berrani et al. | |
| 2009/0002518 | A1* | 1/2009 | Nakamura | H04N 23/88 348/223.1 |
| 2009/0073275 | A1* | 3/2009 | Awazu | G03B 15/02 348/E5.022 |
| 2012/0294600 | A1* | 11/2012 | Osawa | G03B 7/08 396/164 |
| 2020/0035195 | A1 | 1/2020 | Maeng et al. | |
| 2023/0078522 | A1 | 3/2023 | Yu et al. | |
| 2024/0282020 | A1* | 8/2024 | Williams | G06T 11/10 |

FOREIGN PATENT DOCUMENTS

| | | | |
|---|---|---|---|
| CN | 110149473 | | 8/2019 |
| JP | 2009-506688 | | 2/2009 |
| JP | 4451899 | B2 | 2/2010 |
| JP | 4571190 | | 10/2010 |
| JP | 2015-092643 | | 5/2015 |
| JP | 6040042 | B2 | 12/2016 |
| JP | 2018-528482 | | 9/2018 |
| JP | 2020009162 | A | 1/2020 |
| JP | 2020525920 | A | 8/2020 |
| JP | 2023-083258 | | 6/2023 |
| KR | 880001963 | A | 4/1988 |
| KR | 20110094968 | A | 8/2011 |
| KR | 101491123 | B1 | 2/2015 |
| KR | 102124244 | B1 | 6/2020 |
| KR | 20230040111 | A | 3/2023 |
| KR | 20230123105 | A | 8/2023 |
| KR | 10-2708370 | | 9/2024 |

OTHER PUBLICATIONS

Search Report and Written Opinion dated Apr. 21, 2025 issued in International Patent Application No. PCT/KR2025/000932.

* cited by examiner

FIG.3D

314 eighth section (338)
first section (331)
seventh section (337)
second section (332)
sixth section (336)
third section (333)
fifth section (335)
fourth section (334)

multiple sections associated with A (multiple first sub areas)

(a)

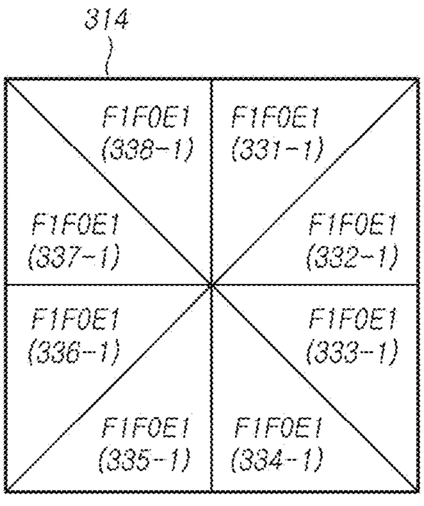

per-section color information about A (per-section average color)

(b)

314

80 (338-2)
90 (331-2)
90 (337-2)
90 (332-2)
80 (336-2)
85 (333-2)
85 (335-2)
80 (334-2)

per-section brightness information about A (per-section average brightness)

(c)

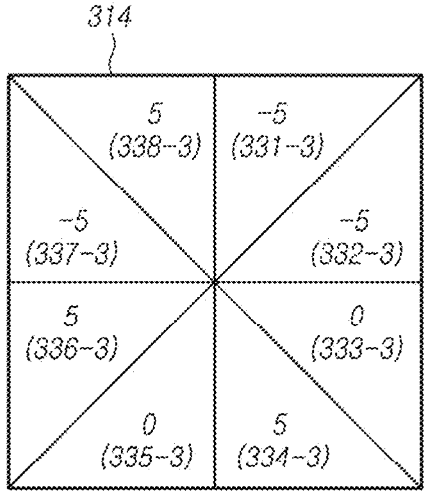

per-section brightness deviation of A

324 eighth section (358)
first section (351)
seventh section (357)
second section (352)
sixth section (356)
third section (353)
fifth section (355)
fourth section (354)

multiple sections associated with B
(multiple second sub areas)

(a)

324

0100E1 (358-1)
01F0E1 (351-1)
01F0E1 (357-1)
01F0E1 (352-1)
01F0E1 (356-1)
01F0E1 (353-1)
11F0E1 (355-1)
01F0E1 (354-1)

per-section color information about B
(per-section average color)

(b)

324

70 (358-2)
90 (351-2)
40 (357-2)
95 (352-2)
30 (356-2)
85 (353-2)
70 (355-2)
80 (354-2)

per-section brightness information about B
(per-section average brightness)

(c)

324

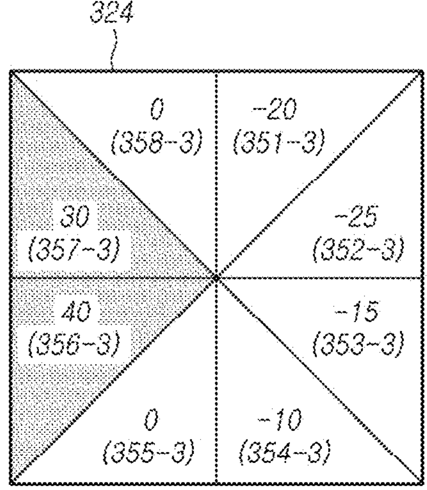

per-section brightness deviation of B (d)

DISPLAY DEVICE AND METHOD FOR OPERATING DISPLAY DEVICE

CROSS-REFERENCE TO RELATED APPLICATIONS

This application is a continuation of International Application No. PCT/KR2025/000932 designating the United States, filed on Jan. 16, 2025, in the Korean Intellectual Property Receiving Office, and claiming priority to Korean Patent Application No. 10-2024-0058860, filed on May 3, 2024, in the Korean Intellectual Property Office, the disclosures of which of which are hereby incorporated by reference herein in their entireties.

BACKGROUND

Field

The disclosure relates to a display device and a method for operating the display device.

Description of Related Art

To obtain high-quality images in various environments, various control operations may be performed depending on the capturing environment. For example, an operation of adjusting the aperture of the camera or the shutter speed or an operation of controlling the lighting according to the ambient brightness may be performed. Lighting is a factor that may significantly affect image quality or atmosphere. Lighting may be controlled to obtain a desired result depending on the capturing purpose. As lighting is a critical part in the capturing process, appropriate lighting control may be an essential technique for obtaining high-quality images.

Different settings and control in various environments may be required when obtaining an image using a camera. For example, the user may be required to individually make device settings or perform functional adjustment appropriate for each environment to obtain an image in a desired color or brightness. Although a control operation such as functional adjustment or device setting is performed, the user may not obtain a desired image, and the control operation may be required to be repeatedly performed until a desired image is obtained.

SUMMARY

Embodiments of the disclosure may provide a display device and a method for operating the display device.

Embodiments of the disclosure may provide a display device providing an image in a color and/or brightness similar to that of a target image and a method for operating the display device.

Embodiments of the disclosure may provide a display device controlling at least one light to obtain an image in a color and/or brightness similar to a target image and a method for operating the display device.

Embodiments of the disclosure may provide a display device determining a setting value of at least one light based on a capturing purpose or capturing use and a method for operating the display device.

Embodiments of the disclosure may provide a display device capable of natural image correction as compared with digital correction, by being able to correct the color and/or brightness of the background as well as the subject, using a light source, and a method for operating the display device.

A display device according to an example embodiment of the disclosure may comprise: at least one camera, a plurality of lights, memory storing at least one program, and at least one processor, comprising processing circuitry, electrically connected to the at least one camera, the plurality of lights, and the memory, wherein at least one processor, individually and/or collectively, is configured to execute instructions of the at least one program and to: obtain a first image, the first image being a target image, and a second image captured through the at least one camera, extract a common component between the first image and the second image, split a first area including the common component in the first image into a plurality of first sub areas and identify an attribute value associated with at least one of a color or a brightness corresponding to each of the plurality of first sub areas as a per-first sub area attribute value, split a second area including the common component in the second image into a plurality of second sub areas and identify an attribute value associated with at least one of a color or a brightness corresponding to each of the plurality of second sub areas as a per-second sub area attribute value, determine whether a difference between the per-first sub area attribute value and the per-second sub area attribute value is within a specified range, based on a result of the determination, identify a difference between at least one first attribute value corresponding to at least one third sub area among the plurality of first sub areas and at least one second attribute value corresponding to at least one fourth sub area among the plurality of second sub areas is not within the specified range, based on the at least one first attribute value, determine a setting value of at least one light associated with the at least one fourth sub area among the plurality of lights, and control the at least one light based on the determined setting value.

According to an example embodiment, the first image may include any one of an image previously captured by the at least one camera, a pre-stored image, an image selected from among a plurality of images, an image downloaded from a server, an image input to the display device, or an image input or received from an external electronic device.

According to an example embodiment, the per-first sub area attribute value may include a value indicating at least one of an average color value or an average brightness value of each of the plurality of first sub areas, and the per-second sub area attribute value may include a value indicating at least one of an average color value or an average brightness value of each of the plurality of second sub areas.

According to an example embodiment, at least one processor, individually and/or collectively, may be configured to: identify color information corresponding to the at least one third sub area based on the at least one first attribute value, and determine a setting value of the at least one light to radiate light of a color corresponding to the identified color information. The color information corresponding to the at least one third sub area may include information indicating an average color value of the at least one third sub area.

According to an example embodiment, the display device may further comprise at least one display. The at least one display may include a plurality of micro light emitting diodes (LEDs). The plurality of lights may correspond to the plurality of micro LEDs.

According to an example embodiment, at least one processor, individually and/or collectively, may be configured to: identify first brightness information corresponding to the at least one third sub area based on the at least one first attribute value, identify second brightness information corresponding to the at least one fourth sub area based on the at least one second attribute value, determine a brightness value based on the first brightness information and the second brightness information, and determine the setting value of the at least one light based on the determined brightness value.

According to an example embodiment, the first brightness information may include information indicating a first brightness deviation. The second brightness information may include information indicating a second brightness deviation. The first brightness deviation may be determined based on a difference between an average brightness value of all of the plurality of first sub areas and an average brightness value of the at least one third sub area. The second brightness deviation may be determined based on a difference between an average brightness value of all of the plurality of second sub areas and an average brightness value of the at least one fourth sub area.

According to an example embodiment, the first brightness information may include information indicating an average brightness value of the at least one third sub area.

According to an example embodiment, at least one processor, individually and/or collectively, may be configured to: determine the setting value of the at least one light based on an average brightness value of the at least one third sub area or a specified brightness value of the at least one light, and a difference value between the first brightness deviation and the second brightness deviation.

According to an example embodiment, at least one processor, individually and/or collectively, may be configured to control the at least one light based on a specified setting value, based on a difference between the per-first sub area attribute value and the per-second sub area attribute value being within the specified range.

A method for operating a display device, according to an example embodiment of the disclosure, may comprise: obtaining a first image, the first image being a target image and a second image captured through at least one camera, extracting a common component between the first image and the second image, splitting a first area including the common component in the first image into a plurality of first sub areas and identifying an attribute value associated with at least one of a color or a brightness corresponding to each of the plurality of first sub areas as a per-first sub area attribute value, splitting a second area including the common component in the second image into a plurality of second sub areas and identifying an attribute value associated with at least one of a color or a brightness corresponding to each of the plurality of second sub areas as a per-second sub area attribute value, determining whether a difference between the per-first sub area attribute value and the per-second sub area attribute value is within a specified range, based on a result of the determination, identifying that a difference between at least one first attribute value corresponding to at least one third sub area among the plurality of first sub areas and at least one second attribute value corresponding to at least one fourth sub area among the plurality of second sub areas is not within the specified range, based on the at least one first attribute value, determining a setting value of at least one light associated with the at least one fourth sub area among a plurality of lights, and controlling the at least one light based on the determined setting value.

According to an example embodiment, the first image may include any one of an image previously captured by the at least one camera, a pre-stored image, an image selected from among a plurality of images, an image downloaded from a server, an image input to the display device, or an image input or received from an external electronic device.

According to an example embodiment, the per-first sub area attribute value may include a value indicating at least one of an average color value or an average brightness value of each of the plurality of first sub areas, and the per-second sub area attribute value may include a value indicating at least one of an average color value or an average brightness value of each of the plurality of second sub areas.

According to an example embodiment, determining the setting value of the at least one light may include identifying color information corresponding to the at least one third sub area based on the at least one first attribute value, and determining a setting value of the at least one light to radiate light of a color corresponding to the identified color information. The color information corresponding to the at least one third sub area may include information indicating an average color value of the at least one third sub area.

According to an example embodiment, the plurality of lights may correspond to a plurality of micro light emitting diodes (LEDs). The plurality of micro LEDs may be included in at least one display included in the display device.

According to an example embodiment, the color information corresponding to the at least one third sub area may include information indicating an average color value of the at least one third sub area.

According to an example embodiment, determining the setting value of the at least one light may include identifying first brightness information corresponding to the at least one third sub area based on the at least one first attribute value, identifying second brightness information corresponding to the at least one fourth sub area based on the at least one second attribute value, determining a brightness value based on the first brightness information and the second brightness information, and determining the setting value of the at least one light based on the determined brightness value.

According to an example embodiment, the first brightness information may include information indicating a first brightness deviation. The second brightness information may include information indicating a second brightness deviation. The first brightness deviation may be determined based on a difference between an average brightness value of all of the plurality of first sub areas and an average brightness value of the at least one third sub area. The second brightness deviation may be determined based on a difference between an average brightness value of all of the plurality of second sub areas and an average brightness value of the at least one fourth sub area.

According to an example embodiment, the first brightness information may include information indicating an average brightness value of the at least one third sub area.

According to an example embodiment, determining the brightness value based on the first brightness information and the second brightness information may include determining the setting value of the at least one light based on an average brightness value of the at least one third sub area or a specified brightness value of the at least one light, and a difference value between the first brightness deviation and the second brightness deviation.

According to an example embodiment, the method may further comprise controlling the at least one light based on a specified setting value, based on a difference between the per-first sub area attribute value and the per-second sub area attribute value being within the specified range.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 3D is a diagram illustrating example information associated with object A included in a first image according to various embodiments;

FIG. 3E is a diagram illustrating example information associated with object B included in a second image according to various embodiments;

Figure 1:
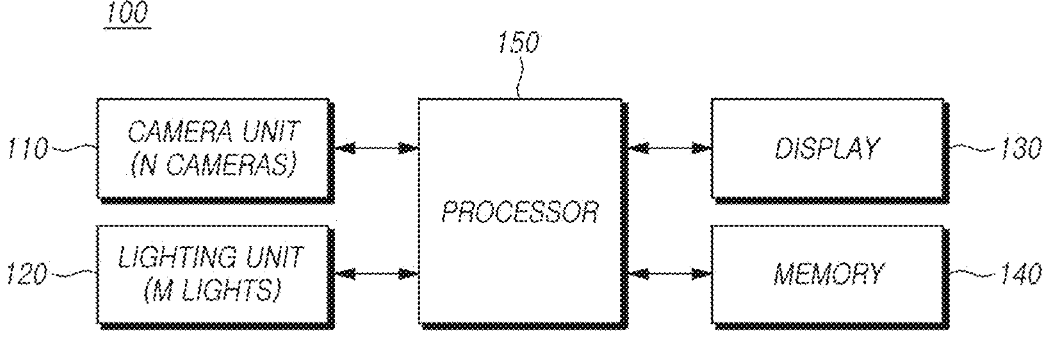
FIG. 1 is a block diagram illustrating an example configuration of a display device according to various embodiments.

In the following description, referring to the accompanying drawings, certain examples for implementing the disclosed disclosure are illustrated as examples in the drawings. Further, other examples may be used and structural changes or modification may be made without departing from the scope of various examples.

DETAILED DESCRIPTION

Hereinafter, various example embodiments of the disclosure will be described in greater detail with reference to the accompanying drawings. However, the disclosure may be implemented in various different forms and is not limited to the various example embodiments described herein. With regard to description of drawings, the same or like components may be indicated by the same or like reference numerals. Further, in the drawings and their related descriptions, descriptions of well-known functions and configurations may be omitted for clarity and brevity.

FIG. 1 is a block diagram illustrating an example configuration of a display device according to various embodiments.

Referring to FIG. 1, the display device 100 may include a camera unit (e.g., including a camera) 110, a lighting unit (e.g., including lights) 120, a display 130, a memory 140, and a processor (e.g., including processing circuitry) 150. According to an example, the display device 100 may include additional components (e.g., an audio output unit that outputs an audio signal to the outside of the display device 100 and/or a communication unit for wired or wireless communication with an external electronic device) in addition to the illustrated components, or at least one of the illustrated components may be omitted.

The camera unit 110 may include at least one camera and capture an image (e.g., a photo or a still image) or a video. According to an example, the camera unit 110 may include N cameras. N may be an integer larger than or equal to 1. Each of the N cameras may include at least one lens and at least one image sensor. According to an example, when the camera unit 110 includes two or more cameras (N≥2), the two or more cameras may be disposed at different positions. The two or more cameras arranged at different positions may capture the subject at multiple angles.

The lighting unit 120 may include various lights and/or light emitting circuitry and be operated in association with the camera unit 110. For example, the lighting unit 120 may be operated based on N cameras performing capturing. According to an example, the lighting unit 120 may include M lights. M may be an integer larger than or equal to 1. Each of the M lights may include a three-color light source. The three-color light source may generate various colors by mixing light of three colors (e.g., red, green and blue). Each of the M lights may provide light of various colors and various brightnesses to the subject captured by the N cameras based on the three-color light source.

The display 130 may perform functions for outputting information in the form of numbers, letters, images and/or graphics. The display 130 may display a screen corresponding to data received from the processor 150. According to an example, the display 130 may display an image captured by N cameras or any one selected from images stored in the memory 140. There may be provided two or more displays 130 depending on the implementation, and the display 130 may be referred to as an output unit, a display unit, or by other terms having an equivalent technical meaning.

According to an example, the display 130 may include a micro light emitting diode (LED) display including micro LEDs. The micro LEDs, respectively, may correspond to M lights and may be used for image display. When the display 130 includes the micro LED display, the display 130 and the lighting unit 120 may have an integrated form.

According to an example, the display 130 may form a layer structure with a touch pad to be configured as a touch screen. In this case, the display 130 may be used as an input device in addition to the output device. The display 130 may include at least one of a liquid crystal display, a thin film transistor-liquid crystal display, an organic light-emitting diode, a flexible display, a 3D display, and an electrophoretic display.

The memory 140 may store at least one program for processing and controlling the processor 150, and may store input and/or output data. According to an example, the memory 140 may store various data used by at least one component (e.g., the camera unit 110 and/or the processor 150) of the display device 100. For example, the memory 140 may store one or more images captured by N cameras of the camera unit 100 and may store a target image. The target image may include any one of an image previously captured by N cameras, an image selected from a plurality of images, an image input to the display device 100, or an image input or received from an external electronic device.

The memory 140 may include a storage medium corresponding to at least one of a flash memory type, a hard disk type, a multimedia card micro type, a card type memory (e.g., secure digital (SD) or extreme digital (XD) memory, random access memory (RAM), static random access memory (SRAM), read-only memory (ROM), electrically erasable programmable read-only memory (EEPROM), programmable read-only memory (PROM), a magnetic memory, a magnetic disc, or an optical disc. The memory 140 may store an artificial intelligence (AI) model.

The processor 150 may include various processing circuitry and control operations of the display device 100. The processor 150 may include a computing device that executes computation or data processing related to control of at least one other component of the display device 100 or a circuit, or a circuit board. The processor 150 may include at least one of an image signal processor (ISP), a central processing unit (CPU), a neural processing unit (NPU), a graphics processing unit (GPU), a micro processing unit (MPU), a micro controller unit (MCU), an application processor (AP), a communication processor (CP), a system on chip (SoC), or an integrated circuit (IC) sensor hub, a supplementary processor, a communication processor), an application processor, an application specific integrated circuit (ASIC), or a field programmable gate arrays (FPGA), and may include a plurality of cores. The processor 150 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an example, the processor 150 may be electrically connected to the camera unit 110, the lighting unit 120, the display 130, and the memory 140, and may execute instructions of at least one program stored in the memory 140. The processor 150 may include processing circuitry that executes instructions of at least one program stored in the memory 140.

According to an example, the processor 150 may control the camera unit 110 and the lighting unit 120 based on the target image. For example, the processor 150 may compare the image obtained by the N cameras of the camera unit 110 with the target image, determine the setting values of M lights of the lighting unit 120 to obtain an image of a brightness and/or color similar to the target image based on the comparison result, and control the M lights with the determined setting value.

According to an example, the processor 150 may perform operations of the display device 100 to be presented below by controlling the camera unit 110, the lighting unit 120, the display 130, and the memory 140.

Figure 2:
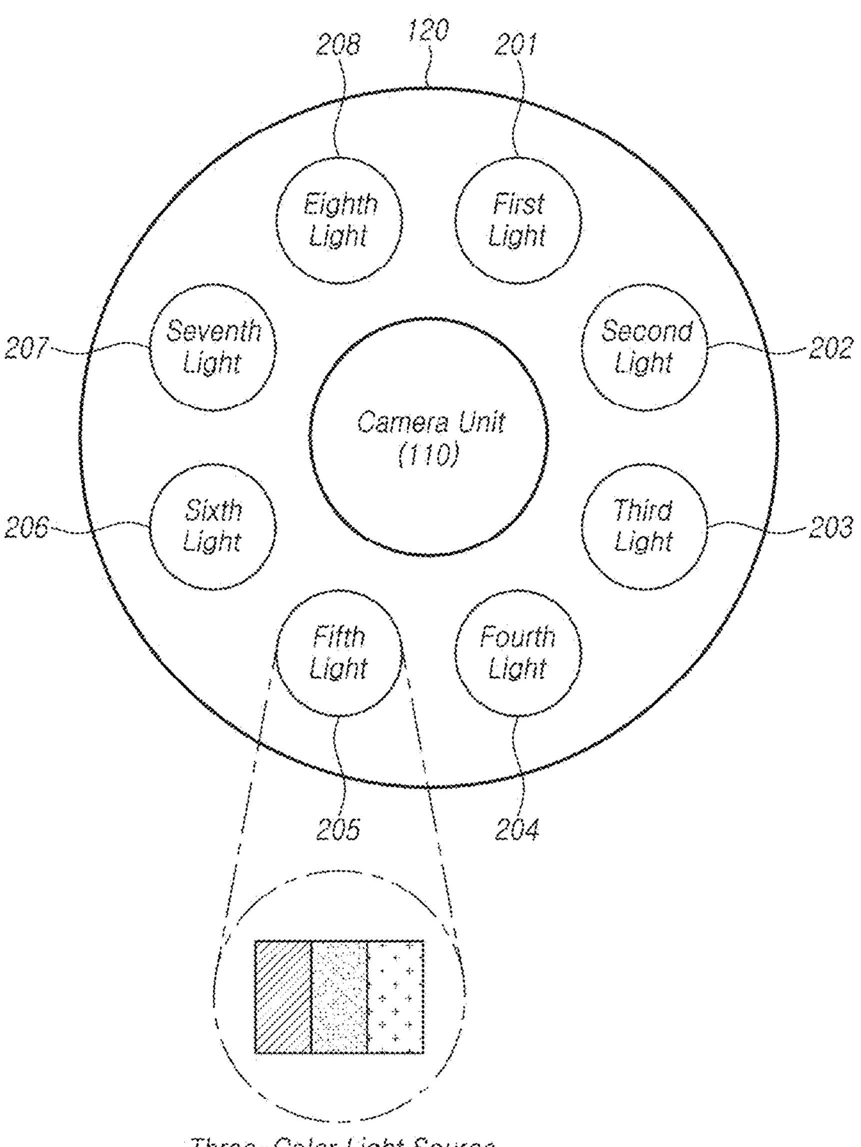
FIG. 2 is a diagram illustrating a camera unit and a lighting unit included in a display device according to various embodiments.

FIG. 2 is a diagram illustrating an example camera unit and lighting unit included in a display device according to various embodiments.

Referring to FIG. 2, the camera unit 110 and the lighting unit 120 may be disposed adjacent to each other. According to an example, the M lights included in the lighting unit 120 may be disposed at a position adjacent to the camera unit 110. For example, when the lighting unit 120 includes eight lights (M=8), the eight lights (e.g., first light 201, second light 202, third light 203, fourth light 204, fifth light 205, sixth light 206, seventh light 207, and eighth light 208) may be disposed to surround the camera unit 110. However, this is merely an example, and the arrangement structure of the camera unit 110 and the lighting unit 120 may be variously changed.

Hereinafter, an operation of controlling lighting by the display device 100 is described with reference to FIGS. 3A, 3B, 3C, 3D, 3E and 3F (which may be referred to as FIGS. 3A to 3F). For ease of understanding, an example where the display device 100 includes a camera unit 110 and a lighting unit 120 arranged as shown in FIG. 2 is described.

Figure 3A:
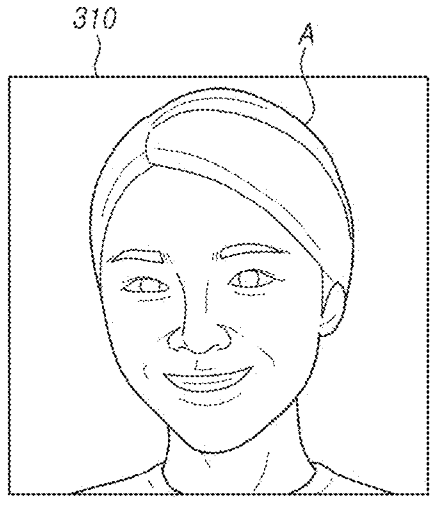
FIG. 3A is a diagram illustrating a first image and a second image according to various embodiments.
Figure 3A:
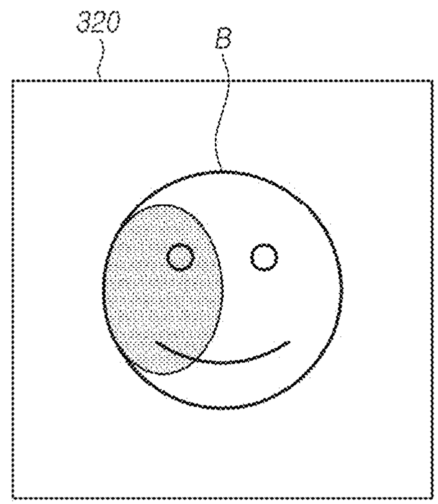

FIG. 3A is a diagram illustrating a first image and a second image according to various embodiments.

Referring to FIG. 3A, a first image 310 may be a target image, and a second image 320 may be an image obtained through at least one camera (N cameras, where N≥1) included in the camera unit 110.

According to an example, the first image 310 may be used to set a target color and/or target brightness for lighting control. The first image 310 may be an image captured with lighting of a color and/or brightness desired by the user. For example, the first image 310 may include any one of an image previously captured by at least one camera, a pre-stored image, an image selected from a plurality of images, an image downloaded from a server, an image input to the display device 100, or an image input or received from an external electronic device.

According to an example, the second image 320 may be used to identify the capturing environment of at least one camera. The second image 320 may include any one of an image captured or photographed through at least one camera, a preview image of at least one camera, or an image captured in real time by at least one camera.

Each of the first image 310 and the second image 320 may include at least one object. The at least one object may include at least one of a person, an animal, a plant, a thing, a structure, or a natural environment.

According to an example, the first image (e.g., a passport photo) 310 may include object A (e.g., user A's face), and the second image (e.g., a preview image) 320 may include object B (e.g., user B's face). Object B may be the subject to be captured, but may also be a background. User A and user B may be the same or different users.

Figure 3B:
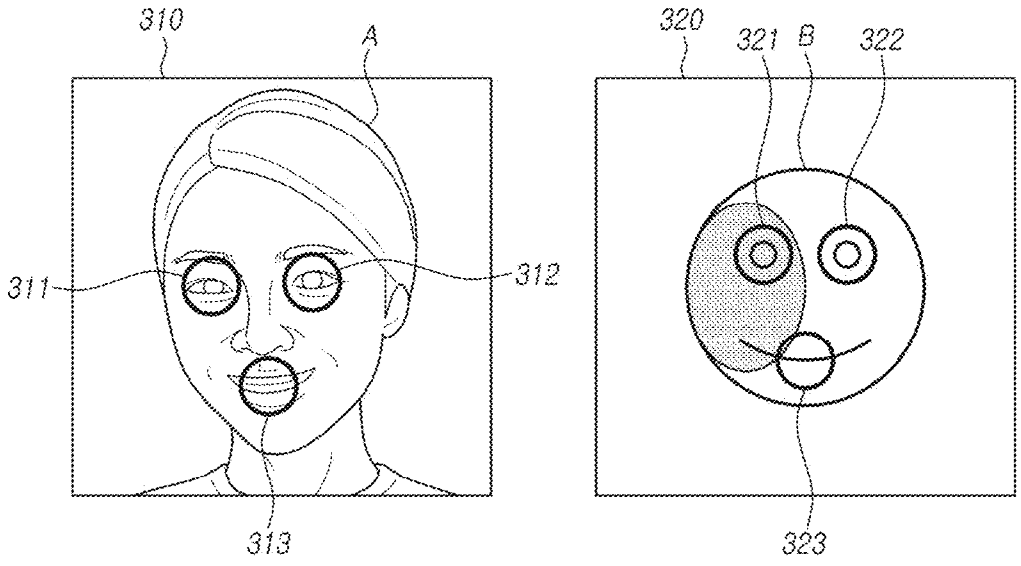
FIG. 3B is a diagram illustrating an example common component of a first image and a second image according to various embodiments.

FIG. 3B is a diagram illustrating an example common component of a first image and a second image according to various embodiments.

Referring to FIG. 3B, the display device 100 may extract common components having common characteristics from the first image 310 and the second image 320 based on obtaining the first image 310 and the second image 320. For example, the display device 100 may extract a first component (e.g., left eye) 311, a second component (e.g., right eye) 312, and a third component (e.g., mouth) 313 included in object A, and a fourth component (e.g., left eye) 321, a fifth component (e.g., right eye) 322, and a sixth component (e.g., mouth) 323 included in object B as the common components. The display device 100 may extract common components of the first image 310 and the second image 320 using a feature matching technology, but a method of extracting common components is not limited thereto and may be used in various ways.

Figure 3C:
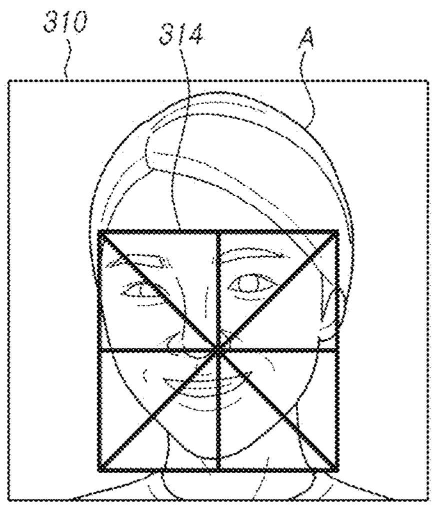
FIG. 3C is a diagram illustrating various example areas including a common component in a first image and a second image according to various embodiments.
Figure 3C:
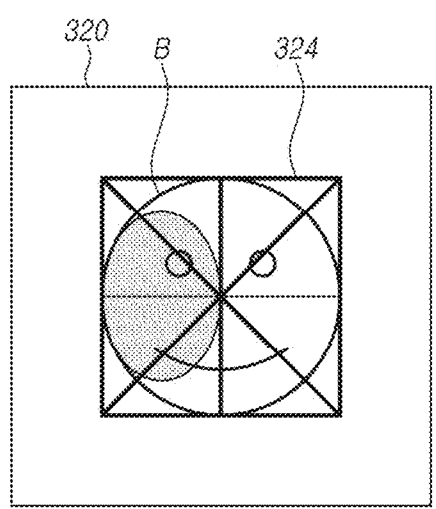

FIG. 3C is a diagram illustrating various example areas including a common component in a first image and a second image according to various embodiments.

Referring to FIG. 3C, the display device 100 may generate an area including a common component in each of the first image 310 and the second image 320 based on the common component of the first image 310 and the second image 320 being extracted.

According to an example, the display device 100 may generate a first area 314, which is an area including the common components (e.g., the first component 311, the second component 312, and the third component 313 of FIG. 3B) in the first image 310.

According to an example, the display device 100 may generate a second area 324, which is an area including the common components (e.g., the fourth component 321, the fifth component 322, and the sixth component 323 of FIG. 3B) in the second image 320.

Each of the first area 314 and the second area 324 may be a rectangular area outside the common component, but the first area 314 and the second area 324 may be an area (e.g., a triangular or circular area) having a different shape from the rectangular area.

According to an example, the display device 100 may generate a plurality of sub areas by splitting the first area 314 based on the first area 314 being generated. For example, the display device 100 may generate a plurality of sub areas by splitting the first area 314 with respect to the center of the first area 314. The plurality of sub areas may have the same or different sizes.

According to an example, the display device 100 may generate a plurality of sub areas by splitting the second area 324 based on the second area 324 being generated. For example, the display device 100 may generate a plurality of sub areas by splitting the second area 324 with respect to the center of the second area 324. The plurality of sub areas may have the same or different sizes.

According to an example, the plurality of sub areas generated by splitting the first area 314 may be referred to as a plurality of first sub areas, and a plurality of sub areas generated by splitting the second area 324 may be referred to as a plurality of second sub areas.

Hereinafter, an example where the plurality of first sub areas are eight sub areas, and the plurality of second sub areas are eight sub areas is described for ease of understanding, but the number of sub areas may be variously changed.

FIG. 3D is a diagram illustrating example information associated with object A included in a first image according to various embodiments.

Referring to FIG. 3D, in (a), the first area 314 associated with object A in the first image 310 may include a plurality of first sub areas, and the plurality of first sub areas may correspond to a plurality of sections. For example, the plurality of sections corresponding to the eight first sub areas may be eight sections including a first section 331, a second section 332, a third section 333, a fourth section 334, a fifth section 335, a sixth section 336, a seventh section 337, and an eighth section 338.

According to an example, the display device 100 may identify an attribute value for each of the plurality of sections. The attribute value for each of the plurality of sections may be related to at least one of color or brightness corresponding to each of the plurality of sections. For example, the attribute value for each of the plurality of sections may be associated with at least one of the per-section color information about object A, per-section brightness information about object A, or per-section brightness deviation of object A, as shown in FIG. 3D in (b) (c) and (d).

Referring to FIG. 3D, in (b), per-section color information about object A may include eight pieces of per-section color information. According to an example, the per-section color information about object A may include an average color value representing an average of color values (e.g., per-pixel RGB values) included in each section. Each per-section average color value may be indicated by a color code or an RGB value. For example, the average color value 331-1 of the first section 331, the average color value 332-1 of the second section 332, the average color value 333-1 of the third section 333, the average color value 334-1 of the fourth section 334, the average color value 335-1 of the sixth section 336, the average color value 337-1 of the seventh section 337, and the average color value 338-1 of the eighth section 338 each may be indicated by the color code F1F0E1.

Referring to FIG. 3D, in (c), the per-section brightness information about object A may include eight pieces of per-section brightness information. According to an example, the per-section brightness information about object A may include an average brightness value representing an average of brightness values (e.g., per-pixel brightness values) included in each area. For example, the average brightness value 331-2 of the first section 331 may be 90, the average brightness value 332-2 of the second section 332 may be 90, the average brightness value 333-2 of the third section 333 may be 85, the average brightness value 334-2 of the fourth section 334 may be 80, the average brightness value 335-2 of the fifth section 335 may be 85, the average brightness value 336-2 of the sixth section 336 may be 80, the average brightness value 337-2 of the seventh section 337 may be 90, and the average brightness value 338-2 of the eighth section 338 may be 80.

Referring to FIG. 3D, in (d), the per-section brightness deviation of object A may be determined based on the difference between the overall average brightness value for the eight sections and the per-section average brightness value. According to an example, when the overall average brightness value is 85, the brightness deviation 331-3 of the first section 331 may be −5, which is a value obtained by subtracting 90 which is the average brightness value 331-2 of the first section 331 from 85 which is the overall average brightness value. The brightness deviation 332-3 of the second section 332 may be −5, which is a value obtained by subtracting 90 which is the average brightness value 332-2 of the second section 332 from 85 which is the overall average brightness value. The brightness deviation 333-3 of the third section 333 may be 0, which is a value obtained by subtracting 85 which is the average brightness value 333-2 of the third section 333 from 85 which is the overall average brightness value. The brightness deviation 334-3 of the fourth section 334 may be 5, which is a value obtained by subtracting 80 which is the average brightness value 334-2 of the fourth section 334 from 85 which is the overall average brightness value. The brightness deviation 335-3 of the fifth section 335 may be 0, which is a value obtained by subtracting 85 which is the average brightness value 335-2 of the fifth section 335 from 85 which is the overall average brightness value. The brightness deviation 336-3 of the sixth section 336 may be 5, which is a value obtained by subtracting 80 which is the average brightness value 336-2 of the sixth section 336 from 85 which is the overall average brightness value. The brightness deviation 337-3 of the seventh section 337 may be −5, which is a value obtained by subtracting 90 which is the average brightness value 337-2 of the seventh section 337 from 85 which is the overall average brightness value. The brightness deviation 338-3 of the eighth section 338 may be 5, which is a value obtained by subtracting 80 which is the average brightness value 338-2 of the eighth section 338 from 85 which is the overall average brightness value.

FIG. 3E is a diagram illustrating example information associated with object B included in a second image according to various embodiments.

Referring to FIG. 3E, in (a), the second area 324 associated with object B in the second image 320 may include a plurality of second sub areas, and the plurality of second sub areas may correspond to the plurality of sections. For example, the plurality of sections corresponding to the eight second sub areas may be eight sections including a first section 351, a second section 352, a third section 353, a fourth section 354, a fifth section 355, a sixth section 356, a seventh section 357, and an eighth section 358.

According to an example, the display device 100 may identify an attribute value for each of the plurality of sections. The attribute value for each of the plurality of sections may be related to at least one of color or brightness corresponding to each of the plurality of sections. For example, the attribute value for each of the plurality of sections may be associated with at least one of the per-section color information about object B, per-section brightness information about object B, or per-section brightness deviation of object B, as shown in FIG. 3E in (b), (c) and (d).

Referring to FIG. 3E, in (b), per-section color information about object B may include eight pieces of per-section color information. According to an example, the per-section color information about object B may include an average color value representing an average of color values (e.g., per-pixel RGB values) included in each section. Each per-section average color value may be indicated by a color code or an RGB value. For example, the average color value 351-1 of the first section 351, the average color value 352-1 of the second section 352, the average color value 353-1 of the third section 353, the average color value 354-1 of the fourth section 354, the average color value 356-1 of the sixth section 356, and the average color value 357-1 of the seventh section 357 each may be indicated by the color code 01F0E1. For example, the average color value 355-1 of the fifth section 355 may be indicated by the color code 11F0E1, and the average color value 358-1 of the eighth section 358 may be indicated by the color code 0100E1.

Referring to FIG. 3E, in (c), the per-section brightness information about object B may include eight pieces of per-section brightness information. According to an example, the per-section brightness information about object B may include an average brightness value representing an average of brightness values (e.g., per-pixel brightness values) included in each area. For example, the average brightness value 351-2 of the first section 351 may be 90, the average brightness value 352-2 of the second section 352 may be 95, the average brightness value 353-2 of the third section 353 may be 85, the average brightness value 354-2 of the fourth section 354 may be 80, the average brightness value 355-2 of the fifth section 355 may be 70, the average brightness value 356-2 of the sixth section 356 may be 30, the average brightness value 357-2 of the seventh section 357 may be 40, and the average brightness value 358-2 of the eighth section 358 may be 70.

Referring to FIG. 3E, in (d), the per-section brightness deviation of object B may be determined based on the difference between the overall average brightness value for the eight sections and the per-section average brightness value. According to an example, when the overall average brightness value is 70, the brightness deviation 351-3 of the first section 351 may be −20, which is a value obtained by subtracting 90 which is the average brightness value 351-2 of the first section 351 from 70 which is the overall average brightness value. The brightness deviation 352-2 of the third section 352 may be −25, which is a value obtained by subtracting 95 which is the average brightness value 352-2 of the second section 352 from 70 which is the overall average brightness value. The brightness deviation 353-3 of the third section 353 may be −15, which is a value obtained by subtracting 85 which is the average brightness value 353-3 of the second section 353 from 70 which is the overall average brightness value. The brightness deviation 354-3 of the fourth section 354 may be −10, which is a value obtained by subtracting 80 which is the average brightness value 354-2 of the fourth section 354 from 70 which is the overall average brightness value. The brightness deviation 355-3 of the fifth section 355 may be 0, which is a value obtained by subtracting 70 which is the average brightness value 335-2 of the fifth section 355 from 70 which is the overall average brightness value. The brightness deviation 356-3 of the sixth section 336 may be 40, which is a value obtained by subtracting 30 which is the average brightness value 356-2 of the sixth section 356 from 70 which is the overall average brightness value. The brightness deviation 357-3 of the seventh section 357 may be 30, which is a value obtained by subtracting 40 which is the average brightness value 357-2 of the seventh section 357 from 70 which is the overall average brightness value. The brightness deviation 358-3 of the eighth section 358 may be 0, which is a value obtained by subtracting 70 which is the average brightness value 358-2 of the eighth section 358 from 70 which is the overall average brightness value.

According to an example, the display device 100 may compare the information illustrated in FIG. 3D, in (b), (c) and (d) with the information illustrated in FIG. 3E, in (b), (c) and (d) for each section.

According to an example, the display device 100 may compare an average color value for each of a plurality of sections of object A illustrated in FIG. 3D in (b) with an average color value for each of a plurality of sections of object B illustrated in FIG. 3E in (b).

For example, the display device 100 may compare the average color value A-1 (e.g., F1F0E1) 331-1 of the first section 331 associated with object A with the average color value B-1 (e.g., 01F0E1) of the first section 351 associated with object B.

As a result of the comparison, when the average color value A-1 331-1 and the average color value B-1 351-1 are the same, the display device 100 may not perform an operation for color correction of the first area 351 associated with object B.

As a result of the comparison, when the average color value A-1 331-1 and the average color value B-1 351-1 are different, the display device 100 may or may not perform color correction of the first area 351 related to object B based on whether the difference between the average color value A-1 331-1 and the average color value B-1 351-1 is within a preset (e.g., specified) range.

For example, the display device 100 may convert F1F0E1 corresponding to the average color value A-1 331-1 and 01F0E1 corresponding to the average color value B-1 351-1 into RGB values (241, 240, 225) and (17, 240, 225), respectively, and then calculate the RGB difference value (224, 0, 0). The display device 100 may calculate the Euclidean distance $d=\sqrt{(224)^2+(0)^2+(0)^2}$ using the RGB difference value (224, 0, 0), and obtain the calculated Euclidean distance 224 as the difference between the average color value A-1 331-1 and the average color value B-1 351-1.

The display device 100 may determine whether the difference between the average color value A-1 331-1 and the average color value B-1 351-1 is within a preset range. When the difference between the average color value A-1 331-1 and the average color value B-1 351-1 is within the preset range, the display device 100 may determine that the average color value A-1 331-1 and the average color value B-1 351-1 are similar to each other and may not perform an operation for color correction.

When the difference between the average color value A-1 331-1 and the average color value B-1 351-1 is not within the preset range, the display device 100 may determine that the average color value A-1 331-1 and the average color value B-1 351-1 are not similar to each other and may perform an operation for color correction.

According to an example, the display device 100 may determine a setting value of at least one light (e.g., the first light 201 of FIG. 2) that provides light to the first section 351 related to object B so that the first section 351 related to object B may include an average color value similar to the average color value A-1 331 of the first section 331 related to object A.

According to an example, when the display device 100 includes a micro LED display, the micro LEDs included in the first section 351 related to object B may be controlled to have a color value similar to the average color value A-1 331-1 of the first section 331 related to object A.

The display device 100 may compare the remaining per-section average color values of object A and object B in a similar manner as described above, and determine a setting value of at least one light corresponding to at least one section of object B based on the per-section comparison results.

According to an example, the setting value of the at least one light may include a color value of the at least one light.

According to an example, when the per-section average color values of object A and object B are different, the color value of the corresponding light may be determined based on the following Equation 1.

$$\text{color of light } x = \text{average color value of } Ax \quad \text{[Equation 1]}$$

In Equation 1, light x may represent a light associated with the x-th section among the plurality of sections of object B ($1 \le x \le M$, where M is the maximum number of lights). For example, light x is a light associated with the x-th section ($1 \le x \le 8$) among the eight sections of object B, and may represent the x-th of the first light 201 to the eighth light 208 of FIG. 2. The color of the light x may represent the color value set for the light x. The average color value of Ax may represent the average color value of the x-th section among the plurality of sections of object A. For example, Ax may represent the average color value of the x-th section ($1 \le x \le 8$) among the eight average color values illustrated in FIG. 3D(b).

According to an example, the display device 100 may compare an average brightness value for each of a plurality of sections of object A illustrated in FIG. 3D in (c) with an average brightness value for each of a plurality of sections of object B illustrated in FIG. 3E in (c).

For example, the display device 100 may compare an average brightness value for each of a plurality of sections of object A illustrated in FIG. 3D in (c) with an average brightness value for each of a plurality of sections of object B illustrated in FIG. 3E in (c).

As a result of the comparison, when the average brightness value for each of the plurality of sections of object A illustrated in FIG. 3D in (c) and the average brightness value for each of the plurality of sections of object B illustrated in FIG. 3E in (c) are the same, the display device 100 may not perform an operation for brightness correction.

As a result of the comparison, when at least one of the plurality of per-section average brightness values of object A illustrated in FIG. 3D in (c) is different from at least one of the plurality of per-section average brightness values of object B illustrated in FIG. 3E in (c), the display device 100 may or may not perform an operation for brightness correction based on whether a difference between the average brightness values is within a preset range.

For example, when the difference between the average brightness values is within the preset range, the display device 100 may not perform an operation for brightness correction.

For example, when the difference between the average brightness values is not within the preset range, the display device 100 may perform an operation for brightness correction.

Table 1 below illustrates an example in which the display device 100 determines whether to perform an operation for brightness correction based on the difference between the average brightness value for each of the plurality of sections of object A illustrated in FIG. 3D in (c) and the average brightness value for each of the plurality of sections of object B illustrated in FIG. 3E in (c).

TABLE 1

| | first section | second section | third section | fourth section | fifth section | sixth section | seventh section | eighth section |
|---|---|---|---|---|---|---|---|---|
| A | 90 | 90 | 85 | 80 | 85 | 80 | 90 | 80 |
| B | 90 | 95 | 85 | 80 | 70 | 30 | 40 | 70 |
| difference (A − B) | 0 | −5 | 0 | 0 | 5 | 50 | 50 | 10 |

TABLE 1-continued

| | first section | second section | third section | fourth section | fifth section | sixth section | seventh section | eighth section |
|---|---|---|---|---|---|---|---|---|
| brightness correction | X | X | X | X | X | ○ | ○ | X |

Referring to Table 1, the display device 100 may not perform an operation for correcting the brightness of the first section 351, the third section 353, and the fourth section 354 associated with object B based on the average brightness value 331-2 of the first section 331 associated with object A and the average brightness value 351-2 of the first section 351 associated with object B being the same as 90, the average brightness value 333-2 of the third section 333 associated with object A and the average brightness value 353-2 of the third section 353 associated with object B being the same as 85, and the average brightness value 334-2 of the fourth section 334 associated with object A and the average brightness value 354-2 of the fourth section 354 associated with object B being the same as 80.

The display device 100 may calculate a difference between each of the average brightness values 332-2, 335-2 to 338-2 of the second section 332, the fifth section 335 to the eighth section 338 associated with object A and each of the average brightness values 352-2, 355-2 to 358-2 of the second section 352, the fifth section 355 to the eighth section 358 associated with object B and determine whether the calculated difference (e.g., K) is within a preset range (e.g., $-20 \leq K \leq 20$).

For example, the difference between the average brightness value 332-2 of the second section 332 associated with object A and the average brightness value 352-2 of the second section 352 associated with object B may be −5, which may be included within a preset range. Based on this, the display device 100 may not perform an operation for correcting the brightness of the second section 352 associated with object B.

For example, the difference between the average brightness value 335-2 of the fifth section 335 associated with object A and the average brightness value 355-2 of the fifth section 355 associated with object B may be 5, which may be included within a preset range. Based on this, the display device 100 may not perform an operation for correcting the brightness of the fifth section 355 associated with object B.

For example, the difference between the average brightness value 336-2 of the sixth section 336 associated with object A and the average brightness value 356-2 of the sixth section 356 associated with object B may be 50, which may not be included within a preset range. Based on this, the display device 100 may perform an operation for correcting the brightness of the sixth section 356 associated with object B.

For example, the difference between the average brightness value 337-2 of the seventh section 337 associated with object A and the average brightness value 357-2 of the seventh section 357 associated with object B may be 50, which may not be included within the preset range. Based on this, the display device 100 may perform an operation for correcting the brightness of the seventh section 357 associated with object B.

For example, the difference between the average brightness value 338-2 of the eighth section 338 associated with object A and the average brightness value 358-2 of the eighth section 358 associated with object B may be 10, which may not be included within the preset range. Based on this, the display device 100 may not perform an operation for correcting the brightness of the eighth section 358 associated with object B.

When the display device 100 performs an operation for brightness correction, the display device 100 may control the brightness of the light so that there is no difference in brightness between object A and object B. According to an example, the display device 100 may control the brightness of the light using Equation 2 below.

$$\text{brightness of light } x = pLx + \text{brightness deviation of } Ax - \text{brightness deviation of } Bx \quad \text{[Equation 2]}$$

(where if the average brightness difference between Bx and Ax is within a preset range, brightness of light x is set to pLx)

In Equation 2, light x may represent a light associated with the x-th section among the plurality of sections of object B ($1 \leq x \leq M$, where M is the maximum number of lights). For example, light x is a light associated with the x-th section ($1 \leq x \leq 8$) among the eight sections of object B, and may represent the x-th of the first light 201 to the eighth light 208 of FIG. 2. The brightness of the light x may represent the brightness value set for the light x.

pLx may represent the average brightness value of Ax or the brightness value set for a previous light x. For example, the initial value of pLx may be an average brightness value of Ax, and pLx after the initial value is used may represent a brightness value set for a previous light x.

The brightness deviation of Ax may represent the brightness deviation value of the x-th section among the plurality of sections of object A. For example, Ax may represent the brightness deviation value of the x-th section among the eight brightness deviation values illustrated in FIG. 3D in (d).

The brightness deviation of Bx may represent the brightness deviation value of the x-th section among the plurality of sections of object B. For example, Bx may represent the brightness deviation value of the x-th section among the eight brightness deviation values illustrated in FIG. 3E in (d).

Figure 3F:
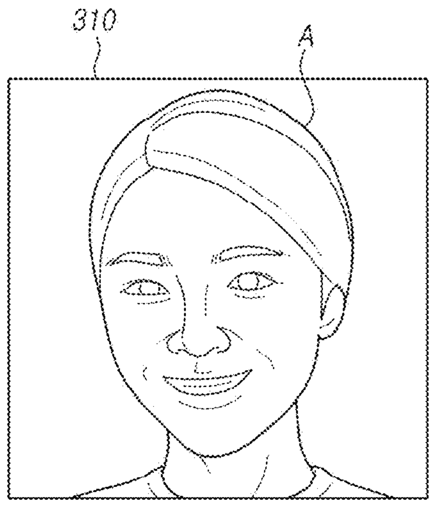
FIG. 3F is a diagram illustrating a third image having an attribute value similar to a first image according to various embodiments.
Figure 3F:
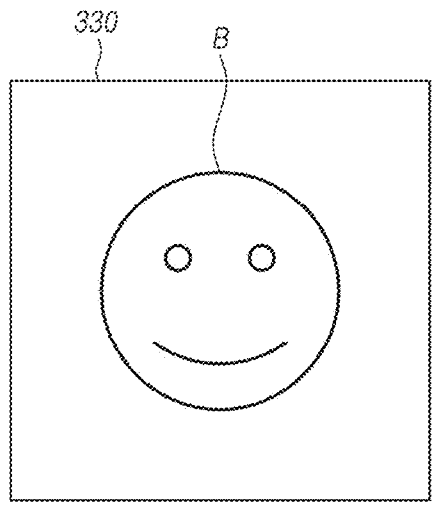

FIG. 3F is a diagram illustrating a third image having an attribute value similar to a first image according to various embodiments.

According to an example, the display device 100 may recapture object B, which is the subject, after performing color correction and/or brightness correction on at least one light. When object B is captured, at least one light may radiate light corresponding to the corrected color and/or brightness to object B.

The display device 100 may obtain a third image 330 by capturing object B again. In the third image 330, object B may have an attribute value similar to object A of the first image 310. For example, in the third image 330, object B may have a color and/or brightness similar to object A of the first image 310. Object B in the third image 330 may not include shading on the left side of the face, unlike object B in the second image 320 of FIG. 3A. As such, correction using a light source may enable natural image correction compared to digital correction, and may correct not only the subject but also the background, allowing for more precise correction.

Hereinafter, example operations of the display device 100 are described in greater detail with reference to FIGS. 4, 5, 6 and 7 (which may be referred to as FIGS. 4 to 7). The operations illustrated in FIGS. 4 to 7 are not limited to the illustrated order but may be performed in various orders. At least one of the operations illustrated in FIGS. 4 to 7 may be omitted, and more operations may be performed by the display device 100 than the operations illustrated in FIGS. 4 to 7.

Figure 4:
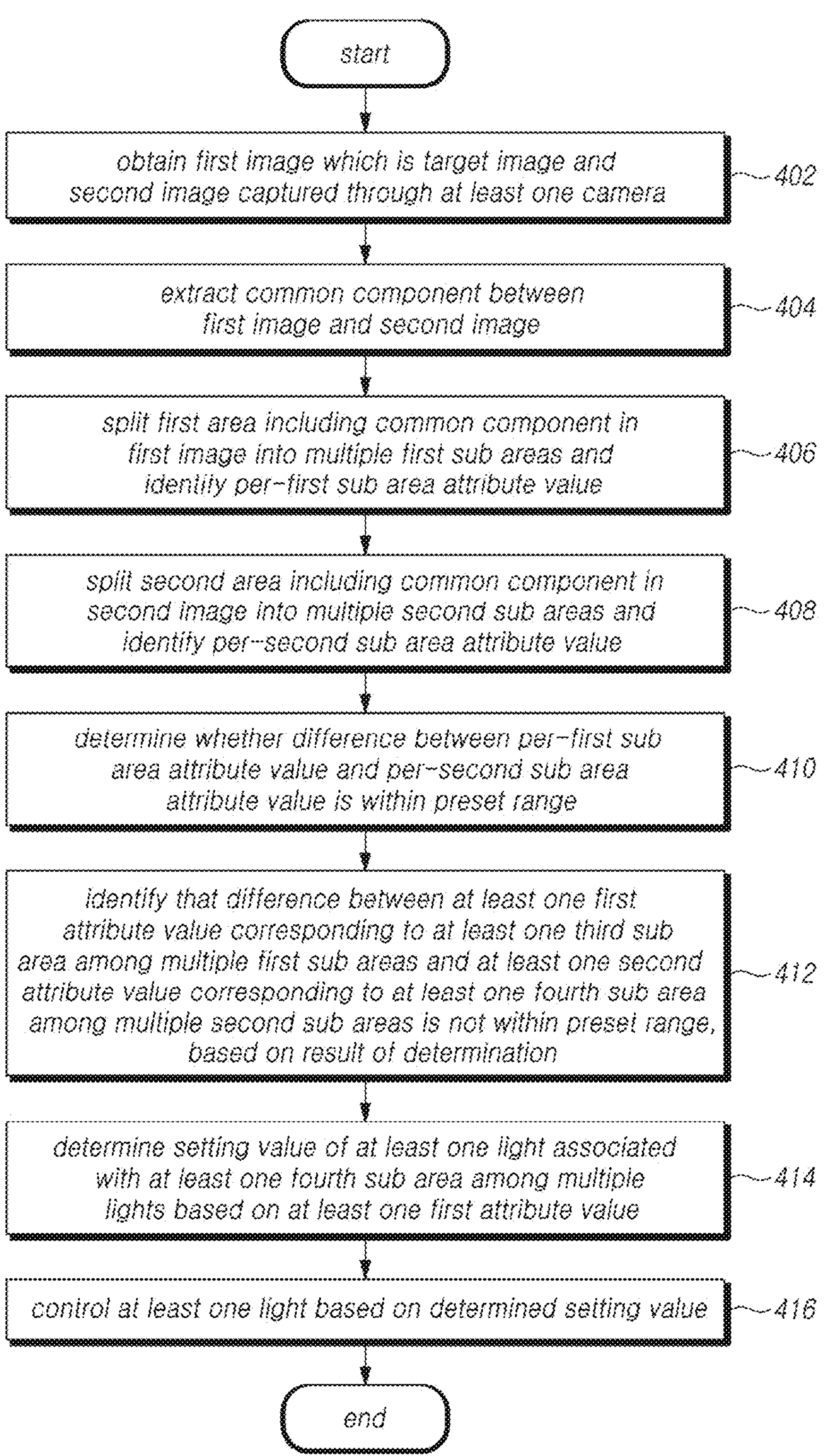
FIG. 4 is a flowchart illustrating example operations of a display device according to various embodiments.

FIG. 4 is a flowchart illustrating example operations of a display device according to various embodiments.

Referring to FIG. 4, in operation 402, the display device 100 may obtain a first image (e.g., the first image 310 of FIG. 3A) which is a target image and a second image captured through at least one camera (e.g., the second image 320 of FIG. 3A). According to an example, the first image may include any one of an image previously captured by at least one camera, a pre-stored image, an image selected from a plurality of images, an image downloaded from a server, an image input to the display device 100, or an image input or received from an external electronic device.

In operation 404, the display device 100 may extract a common component between the first image and the second image.

In operation 406, the display device 100 may split the first area (e.g., the first area 314 of FIG. 3C) including common components (e.g., the first component 311, the second component 312, and the third component 313) in the first image into a plurality of first sub areas and identify an attribute value for each first sub area.

According to an example, the plurality of first sub areas may correspond to the plurality of sections (e.g., eight sections) as shown in FIG. 3D in (a).

According to an example, the per-first sub area attribute value relates to at least one of the information illustrated in (b), (c) and (d) of FIG. 3D, and may be associated with at least one of the color or brightness corresponding to each of the plurality of first sub areas. For example, the per-first sub area attribute value may include a value indicating at least one of an average color value or an average brightness value of each of the plurality of first sub areas.

In operation 408, the display device 100 may split the second area (e.g., the second area 324 of FIG. 3C) including common components (e.g., the fourth component 321, the fifth component 322, and the sixth component 323) in the second image into a plurality of second sub areas and identify an attribute value for each second sub area.

According to an example, the plurality of second sub areas may correspond to the plurality of sections (e.g., eight sections) as shown in FIG. 3E in (a).

According to an example, the per-second sub area attribute value relates to at least one of the information illustrated in (b), (c) and (d) of FIG. 3E, and may be associated with at least one of the color or brightness corresponding to each of the plurality of second sub areas. For example, the per-second sub area attribute value may include a value indicating at least one of an average color value or an average brightness value of each of the plurality of second sub areas.

In operation 410, the display device 100 may determine whether a difference between the per-first sub area attribute value and the per-second sub area attribute value is within a preset (e.g., specified) range.

In operation 412, the display device 100 may identify that a difference between at least one first attribute value (e.g., the average color value 336-1 and the average color value 337-1 of FIG. 3D in (b) and/or the average brightness value 336-2 and the average brightness value 337-2 of FIG. 3D in (c)) corresponding to at least one third sub area (e.g., the sixth section 336 and the seventh section 337 of FIG. 3D in (a)) among the plurality of first sub areas and at least one second attribute value (e.g., the average color value 356-1 and the average color value 357-1 of FIG. 3E in (b) and/or the average brightness value 356-2 and the average brightness value 357-2 of FIG. 3D in (c)) corresponding to at least one fourth sub area (e.g., the sixth section 356 and the seventh section 357 of FIG. 3E in (a)) among the plurality of second sub areas is not within the preset range, based on the determination result.

In operation 414, the display device 100 may determine a setting value of at least one light (e.g., the sixth light 206 and the seventh light 207 of FIG. 2) associated with at least one fourth sub area among the plurality of lights based on the at least one first attribute value. According to an example, the plurality of lights may be lights configured separately from the display 130 or may correspond to a plurality of micro LEDs included in the display 130.

In operation 416, the display device 100 may control at least one light based on the determined setting value.

According to an example, the display device 100 may control the at least one light based on a predetermined setting value, based on a difference between the per-first sub area attribute value and the per-second sub area attribute value being within the preset range as a result of the determination of operation 410.

Figure 5:
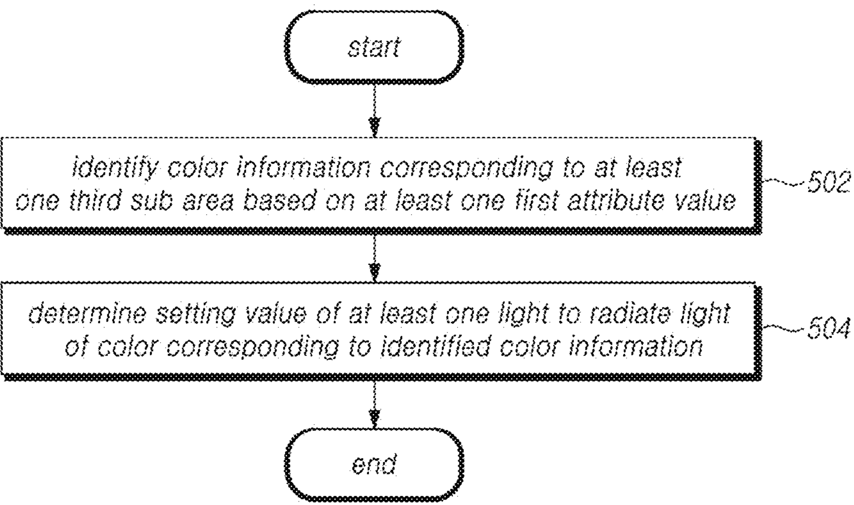
FIG. 5 is a flowchart illustrating an example operation of determining a setting value of at least one light for color correction by a display device according to various embodiments.

FIG. 5 is a flowchart illustrating an example operation of determining a setting value of at least one light for color correction by a display device according to various embodiments.

According to an example, the operations illustrated in FIG. 5 may be performed in operation 414 of FIG. 4.

Referring to FIG. 5, in operation 502, the display device 100 may identify color information corresponding to at least one third sub area based on at least one first attribute value.

In operation 504, the display device 100 may determine a setting value of at least one light to radiate light of a color corresponding to the identified color information. According to an example, the color information corresponding to the at least one third sub area may include information indicating an average color value of the at least one third sub area.

Figure 6:
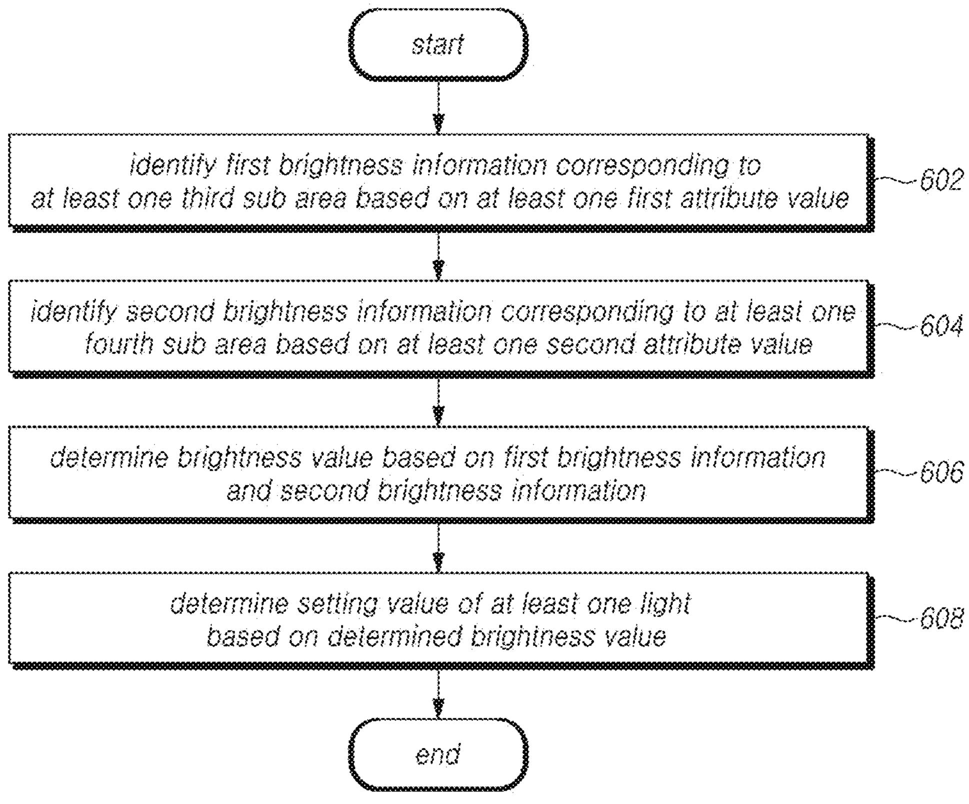
FIG. 6 is a flowchart illustrating an example operation of determining a setting value of at least one light for brightness correction by a display device according to various embodiments.

FIG. 6 is a flowchart illustrating an example operation of determining a setting value of at least one light for brightness correction by a display device according to various embodiments.

According to an example, the operations illustrated in FIG. 6 may be performed in operation 414 of FIG. 4.

Referring to FIG. 6, in operation 602, the display device 100 may identify first brightness information corresponding to at least one third sub area based on at least one first attribute value. According to an example, the first brightness information may include information indicating an average brightness value of at least one third sub area and/or information indicating a first brightness deviation. The first brightness deviation may be determined based on a difference between an average brightness value of all of the plurality of first sub areas and an average brightness value of the at least one third sub area.

In operation 604, the display device 100 may identify second brightness information corresponding to at least one fourth sub area based on at least one second attribute value. According to an example, the second brightness information may include information indicating an average brightness value of at least one fourth sub area and/or information indicating a second brightness deviation. The second brightness deviation may be determined based on a difference between an average brightness value of all of the plurality of second sub areas and an average brightness value of the at least one fourth sub area.

In operation 606, the display device 100 may determine a brightness value based on the first brightness information and the second brightness information. According to an example, the display device 100 may determine the brightness value based on the average brightness value of at least one third sub area or a previously set brightness value of at least one light, and the difference value between the first brightness deviation and the second brightness deviation. For example, the display device 100 may determine the brightness value based on Equation 2.

In operation 608, the display device 100 may determine a setting value of at least one light based on the determined brightness value.

Figure 7:
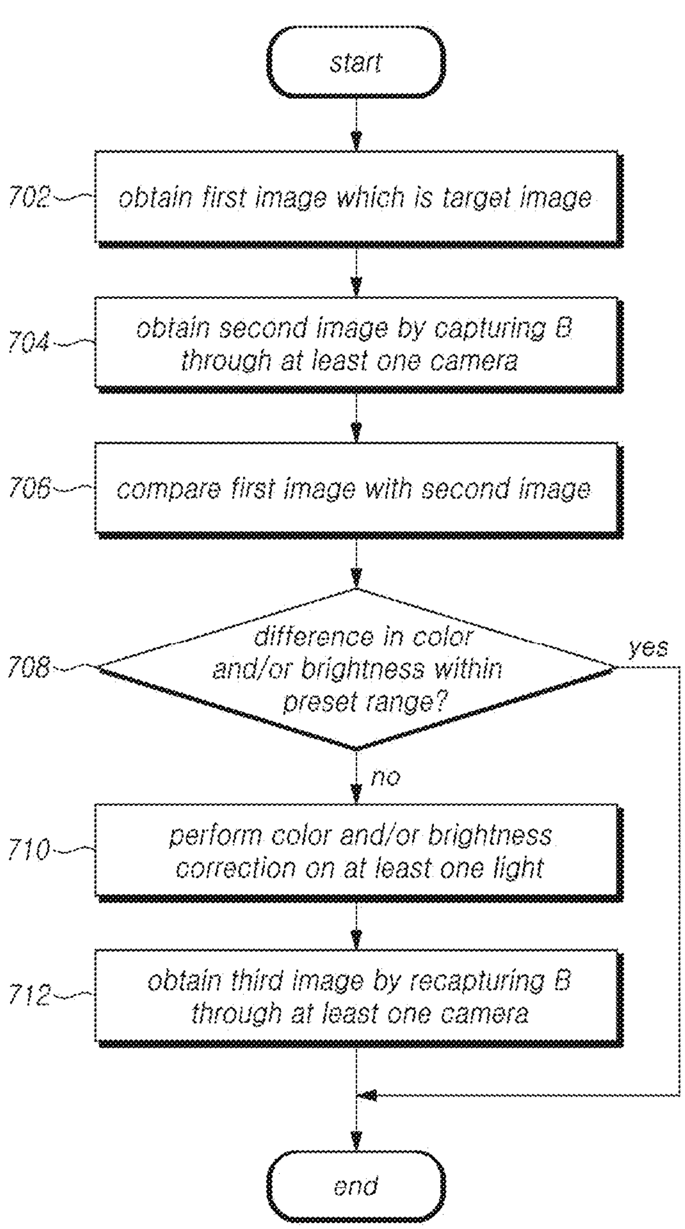
FIG. 7 is a flowchart illustrating an example operation of obtaining an image by a display device according to various embodiments.

FIG. 7 is a flowchart illustrating an example operation of obtaining an image by a display device according to various embodiments.

Referring to FIG. 7, in operation 702, the display device 100 may obtain a first image that is a target image.

In operation 704, the display device 100 may obtain a second image by capturing B through at least one camera.

According to an example, operations 702 and 704 may be performed simultaneously, or operation 704 may be performed before operation 702.

In operation 706, the display device 100 may compare the first image with the second image.

In operation 708, the display device 100 may determine whether the difference in color and/or brightness between the first image and the second image is within a preset range.

According to an example, the display device 100 may extract common components (e.g., the subject and/or the background) from the first image and the second image, and determine whether a difference in color and/or brightness for each common component is within a preset range.

The area including the common component in each of the first image and the second image may or may not be split. For example, when the area including the common component is larger than or equal to a preset size, it may be split, and when the area including the common component is less than the preset size, it may not be split. When the area including the common component is split, the display device 100 may determine whether a difference in color and/or brightness for each area generated by being split is within a preset range.

The display device 100 may terminate the operation based on the difference in color and/or brightness between the first image and the second image being within the preset range ('yes' in operation 708). According to an example, when the difference in color and/or brightness between the first image and the second image is within the preset range, the display device 100 may determine that the colors and/or brightnesses of the first image and the second image are similar, and control at least one lighting based on a previously determined setting value.

The display device 100 may perform color and/or brightness correction on at least one light in operation 710 based on the difference in color and/or brightness between the first image and the second image being not within the preset range ('no' in operation 708). For example, the display device 100 may perform color and/or brightness correction on at least one light based on an operation similar to operations 412 to 416.

In operation 712, the display device 100 may obtain a third image by recapturing B through at least one camera. According to an example, at least one light on which color and/or brightness correction is performed may be used when B is captured again by at least one camera. The obtained third image may be an image of a color and/or brightness similar to the first image.

According to an example, after performing operation 712, the display device 100 may repeatedly perform operation 706 or the subsequent operations. The display device 100 may use the third image instead of the second image in operation 706 or the subsequent operations that are repeatedly performed. The display device 100 may repeatedly perform operation 706 or the subsequent operations until the third image has a color and/or brightness similar to that of the first image.

According to an example, the display device 100 may be various types of display devices. For example, the display device 100 may be a first-type display device that may be included in a large-scale capturing system, or a second-type display device such as a smart mirror or a mobile device.

Figure 8:
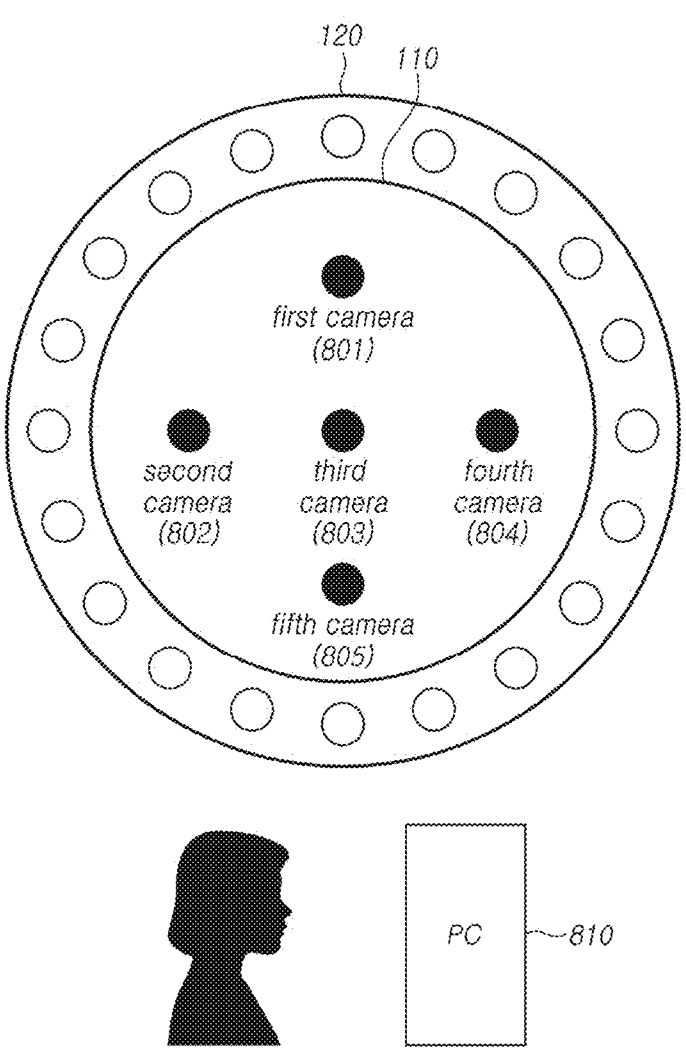
FIG. 8 is a diagram illustrating an example first-type display device according to various embodiments.
Figure 9A:
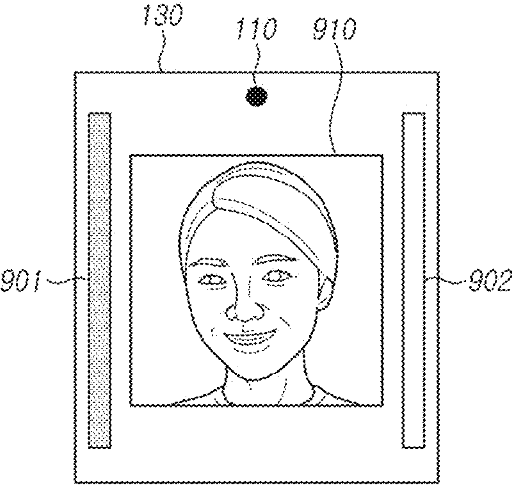
FIGS. 9A, 9B and 9C are diagrams illustrating examples of a second-type display device according to various embodiments.
Figure 9B:
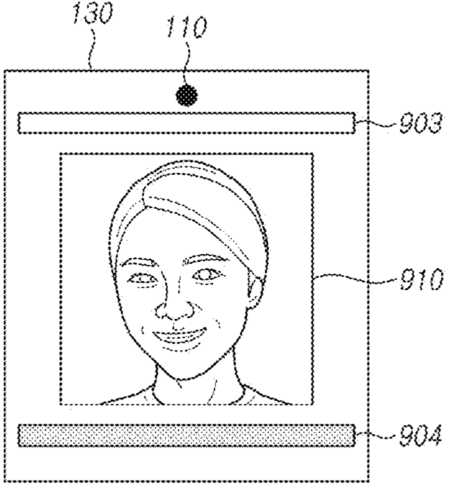
Figure 9C:
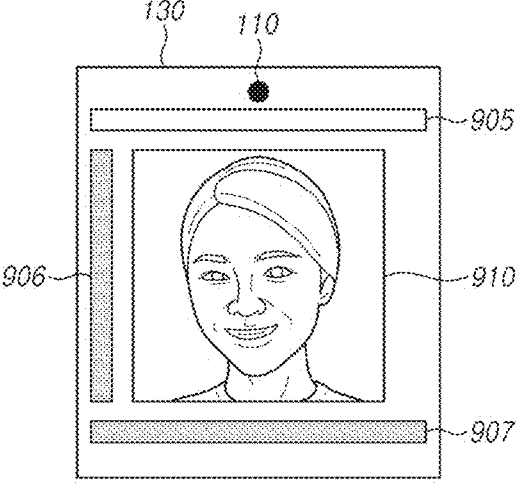

When the display device 100 is a first-type display device, the display device 100 may be configured as illustrated in FIG. 8. When the display device 100 is a second-type display device, the display device 100 may be configured as illustrated in FIGS. 9A, 9B and 9C. However, this is merely an example configuration, and the configuration of the display device 100 may be changed in various forms.

FIG. 8 is a diagram illustrating an example first-type display device according to various embodiments.

Referring to FIG. 8, the display device 100 may be a first-type display device that may be included in a large-scale capturing system. When the display device 100 is a first-type display device, the camera unit 110, the lighting unit 120, and the display unit 130 included in the display device 100 may be included in different devices to configure one system.

According to an example, the large-scale capturing system may include a capturing device and an electronic device, e.g., a personal computer (PC) 810. When the capturing device and the PC 810 are configured as separate devices, the capturing device and the PC 810 may be wiredly or wirelessly connected to each other. When the capturing device and the PC 810 are not configured as separate devices, the capturing device may be included in the PC 810.

The capturing device may include a camera unit 110 and a lighting unit 120, and the PC 810 may include a display unit 130 or may be connected to a display unit 130 configured as a monitor. When the display unit 130 is configured as a monitor, the capturing device may be included inside or outside the monitor.

The camera unit 110 and the lighting unit 120 may be configured in various forms within the capturing device. The camera unit 110 and the lighting unit 120 may be configured as illustrated in FIG. 2 or may be configured differently as illustrated in FIG. 2. For example, the camera unit 110 may include five cameras of a first camera 801, a second camera 802, a third camera 803, a fourth camera 804, and a fifth camera 805, and the lighting unit 120 may include more than five lights.

When capturing the subject using at least one of the five cameras included in the camera unit 100, the lights of the lighting unit 120 may be used for color and/or brightness correction for each section associated with the subject. The lights of the lighting unit 120 may be disposed to surround the camera unit 110, but the configurations of the camera unit 110 and the lighting unit 120 are not limited to the configurations shown in FIG. 8, and may be variously changed.

FIGS. 9A, 9B and 9C are diagrams view illustrating examples of a second-type display device according to various embodiments.

Referring to FIGS. 9A, 9B and 9C, the display device 100 may be a second-type display device. According to an example, the second-type display device may be a smart mirror (e.g., a desk or wall mounted smart mirror, or a smart mirror of a set size (e.g., 17 inches) or a mobile device (e.g., a mobile phone or tablet). According to an example, the second-type display device 100 may include the camera unit 110 and the display 130 on the same surface (e.g., the front or rear surface of the display device 100), but is not limited thereto.

When the display device 100 is a second-type display device, the display 130 of the display device 100 may include a micro LED display including micro LEDs. The micro LED display may be a display including not only a display function but also a lighting function. Each of the micro LEDs included in the micro LED display may correspond to a light and may be individually controlled for color and/or brightness correction.

Referring to FIGS. 9A, 9B and 9C, the display device 100 may display an image 910 obtained through at least one camera of the camera unit 110 on the display 130. For example, the image 910 may include any one of an image captured or photographed through at least one camera, a preview image of at least one camera, or an image captured in real time by at least one camera.

The images 910 shown in FIGS. 9A, 9B and 9C may be images obtained in different capturing environments. The images 910 shown in FIG. 9A, FIG. 9B and FIG. 9C may be images obtained based on lights controlled in a corresponding capturing environment. According to an example, the controlled lights may include at least one light light-corrected (e.g., color and/or brightness corrected) based on the method described above.

Referring to FIG. 9A, the display device 100 may control the left micro LEDs 901 to correct the color of the left area of the image 910. For example, the display device 100 may control the left micro LEDs 901 to emit light in the form of a rod of a specific color (e.g., yellow).

The display device 100 may control the right micro LEDs 902 to increase the brightness of the right area of the image 910. For example, the display device 100 may control the right micro LEDs 902 to emit light in the form of a rod of a specific color (e.g., white) in the right area of the image 910 using the high luminance of each micro LED.

According to an example, when the display device 100 is a smart mirror, the subject (e.g., the user) may be light-corrected based on the left micro LEDs 901 and the right micro LEDs 902. The display device 100 may display the image 910 including the light-corrected subject on the display 130 in a manner in which it is reflected by a mirror and displayed.

Referring to FIG. 9B, the display device 100 may control the upper micro LEDs 903 and the lower micro LEDs 904 to perform light correction on the upper and lower areas of the image 910. For example, the display device 100 may control the upper micro LEDs 903 to emit light in the form of a rod of a specific color for brightness correction, and the lower micro LEDs 904 to emit light in the form of a rod of a specific color for color correction.

According to an example, when the display device 100 is a mobile device and the user takes a selfie of his or her face, the user's face may be light-corrected based on the upper micro LEDs 903 and the lower micro LEDs 904. The display device 100 may display an image 910 including the light-corrected user's face on the display 130.

Referring to FIG. 9C, the display device 100 may control the upper micro LEDs 905, the left micro LEDs 906, and the lower micro LEDs 907 to perform light correction on the upper, left, and lower areas of the image 910. For example, the display device 100 may control the upper micro LEDs 905 to emit light in the form of a rod of a specific color for brightness correction, and the left micro LEDs 906 and the lower micro LEDs 907 to emit light in the form of a rod of a specific color for color correction.

In FIGS. 9A, 9B and 9C, light in the form of a rod is emitted for light correction as an example but, without limitations thereto, various forms of light may be emitted. When two or more micro LEDs are used as lights, light of two or more colors and/or different brightnesses may be emitted. For example, two or more micro LEDs may emit different colors of light to form gradations or may emit light of different colors or brightnesses to perform more accurate light correction.

Light for light correction may be emitted at various positions within the display 130. For example, the display device 100 may control micro LEDs around the image 910 for light correction, as shown in FIGS. 9A, 9B and 9C, but may also control micro LEDs displaying the image 910 for light correction. The display device 100 may perform light correction by adjusting the color and/or brightness of micro LEDs displaying the image 910.

As described above, the display device 100 may control at least one light to obtain an image of color and/or brightness similar to the target image. For example, if a photo captured with the light desired by the user is input as the target image, the display device 100 may set the light to obtain an image of a color or brightness similar to the color and brightness of the target image.

According to an example, the display device 100 may control at least one light based on a plurality of target images. For example, the display device 100 may determine a preferred lighting setting value based on photos stored in a photo album of a mobile device. The display device 100 may select photos (e.g., selfie photos) including common components among the photos stored in the photo album of the mobile device, and determine a preferred lighting setting value based on the selected photos. The display device 100 may perform the photo selection operation by the user's selection, using an AI model stored in the memory 140, or through an external server (e.g., an AI server or an application server).

The display device 100 may determine the preferred lighting setting value based on an average of color values for each section and/or an average of brightness values for each section of the selected photos. When the user takes a selfie, the display device 100 may control at least one light based on the preferred lighting setting value.

According to an example, the light of the display device 100 may be controlled to have an optimal setting value based on various capturing purposes or capturing uses.

For example, when the display device 100 may be a skin analysis device, the light of the display device 100 may be controlled to have a setting value of color and/or brightness that makes the entire face skin visible. In this case, accurate skin analysis may be possible regardless of the surrounding environment or skin color.

For example, when the display device 100 is a two-dimensional (2D) or three-dimensional (3D) capture device, the light of the display device 100 may be controlled to have a setting value of color and/or brightness that allows all of the surfaces of the subject to be captured.

For example, if the display device 100 is used for pictorial, goods, passport photo, personal broadcast, or studio shooting, even if the subject is changed, the display device 100 may be controlled to have a setting value of color and/or brightness suitable for the purpose of production.

Further, the display device 100 may perform lighting control operations in various fields.

The various embodiments and terms used herein are not intended to limit the technical features described herein to specific embodiments and should be understood to include various modifications, equivalents, or substitutes of the various embodiments. In connection with the description of the drawings, like reference numerals may be used for similar or related components. In this disclosure, each of the phrases such as "A or B," "at least one of A and B," "at least one of A or B," "A, B or C," "at least one of A, B and C," and "at least one of A, B, or C" may include any one of the items enumerated together in a corresponding one of the phrases, or all possible combinations thereof. Terms such as "the first," "the second," or "first," or "second" may be used simply to distinguish a corresponding component from another corresponding component, and do not limit the corresponding components in view of other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

The term "module" used in various embodiments of the disclosure may include a unit implemented in hardware, software, or firmware, or any combination thereof, and be used interchangeably with terms such as e.g., logic, logic block, part, component, or circuitry, for example. The module or unit may be a minimum unit or a part of the integrally configured component or the component that performs one or more functions. For example, according to an embodiment, the module or unit may be implemented in the form of an application-specific integrated circuit (ASIC).

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the full scope of the disclosure, including the appended claims and their equivalents. It will also be understood that any of the embodiment(s) described herein may be used in conjunction with any other embodiment(s) described herein.

What is claimed is:

1. A display device, comprising:

at least one camera;

a plurality of lights;

memory storing at least one program; and at least one processor, comprising processing circuitry, electrically connected to the at least one camera, the plurality of lights, and the memory, wherein at least one processor, individually and/or collectively, is configured to execute instructions of the at least one program and to:

obtain a first image, the first image being a target image, and a second image captured through the at least one camera;

extract a common component between the first image and the second image;

split a first area including the common component in the first image into a plurality of first sub areas, and identify an attribute value associated with at least one of a color or a brightness corresponding to each of the plurality of first sub areas as a per-first sub area attribute value;

split a second area including the common component in the second image into a plurality of second sub areas, and identify an attribute value associated with at least one of a color or a brightness corresponding to each of the plurality of second sub areas as a per-second sub area attribute value;

determine whether a difference between the per-first sub area attribute value and the per-second sub area attribute value is within a specified range;

based on a result of the determination, identify that a difference between at least one first attribute value corresponding to at least one third sub area among the plurality of first sub areas and at least one second attribute value corresponding to at least one fourth sub area among the plurality of second sub areas is not within the specified range;

based on the at least one first attribute value, determine a setting value of at least one light associated with the at least one fourth sub area among the plurality of lights; and control the at least one light based on the determined setting value.

2. The display device of claim 1, wherein the first image includes any one of an image previously captured by the at least one camera, a pre-stored image, an image selected from among a plurality of images, an image downloaded from a server, an image input to the display device, or an image input or received from an external electronic device.

3. The display device of claim 1, wherein the per-first sub area attribute value includes a value indicating at least one of an average color value or an average brightness value of each of the plurality of first sub areas, and wherein the per-second sub area attribute value includes a value indicating at least one of an average color value or an average brightness value of each of the plurality of second sub areas.

4. The display device of claim 1, wherein at least one processor, individually and/or collectively, is configured to:

identify color information corresponding to the at least one third sub area based on the at least one first attribute value; and determine a setting value of the at least one light to radiate light of a color corresponding to the identified color information, and wherein the color information corresponding to the at least one third sub area includes information indicating an average color value of the at least one third sub area.

5. The display device of claim 1, further comprising at least one display, wherein the at least one display includes a plurality of micro light emitting diodes (LEDs), and wherein the plurality of lights correspond to the plurality of micro LEDs.

6. The display device of claim 1, wherein at least one processor, individually and/or collectively, is configured to:

identify first brightness information corresponding to the at least one third sub area based on the at least one first attribute value;

identify second brightness information corresponding to the at least one fourth sub area based on the at least one second attribute value;

determine a brightness value based on the first brightness information and the second brightness information; and determine the setting value of the at least one light based on the determined brightness value.

7. The display device of claim 6, wherein the first brightness information includes information indicating a first brightness deviation, wherein the second brightness information includes information indicating a second brightness deviation, wherein the first brightness deviation is determined based on a difference between an average brightness value of all of the plurality of first sub areas and an average brightness value of the at least one third sub area, and wherein the second brightness deviation is determined based on a difference between an average brightness value of all of the plurality of second sub areas and an average brightness value of the at least one fourth sub area.

8. The display device of claim 6, wherein the first brightness information includes information indicating an average brightness value of the at least one third sub area.

9. The display device of claim 8, wherein at least one processor, individually and/or collectively, is configured to:

determine the setting value of the at least one light based on an average brightness value of the at least one third sub area or a specified brightness value of the at least one light, and a difference value between the first brightness deviation and the second brightness deviation.

10. The display device of claim 1, wherein at least one processor, individually and/or collectively, is configured to:

control the at least one light based on a specified setting value, based on a difference between the per-first sub area attribute value and the per-second sub area attribute value being within the specified range.

11. A method for operating a display device, the method comprising:

obtaining a first image, the first image being a target image and a second image captured through at least one camera;

extracting a common component between the first image and the second image;

splitting a first area including the common component in the first image into a plurality of first sub areas and identifying an attribute value associated with at least one of a color or a brightness corresponding to each of the plurality of first sub areas as a per-first sub area attribute value;

splitting a second area including the common component in the second image into a plurality of second sub areas and identifying an attribute value associated with at least one of a color or a brightness corresponding to each of the plurality of second sub areas as a per-second sub area attribute value;

determining whether a difference between the per-first sub area attribute value and the per-second sub area attribute value is within a specified range;

based on a result of the determination, identifying that a difference between at least one first attribute value corresponding to at least one third sub area among the plurality of first sub areas and at least one second attribute value corresponding to at least one fourth sub area among the plurality of second sub areas is not within the specified range;

based on the at least one first attribute value, determining a setting value of at least one light associated with the at least one fourth sub area among a plurality of lights; and controlling the at least one light based on the determined setting value.

12. The method of claim 11, wherein the first image includes any one of an image previously captured by the at least one camera, a pre-stored image, an image selected from among a plurality of images, an image downloaded from a server, an image input to the display device, or an image input or received from an external electronic device.

13. The method of claim 11, wherein the per-first sub area attribute value includes a value indicating at least one of an average color value or an average brightness value of each of the plurality of first sub areas, and wherein the per-second sub area attribute value includes a value indicating at least one of an average color value or an average brightness value of each of the plurality of second sub areas.

14. The method of claim 11, wherein determining the setting value of the at least one light includes:

identifying color information corresponding to the at least one third sub area based on the at least one first attribute value; and determining a setting value of the at least one light to radiate light of a color corresponding to the identified color information, and wherein the color information corresponding to the at least one third sub area includes information indicating an average color value of the at least one third sub area.

15. The method of claim 11, wherein the plurality of lights correspond to a plurality of micro light emitting diodes (LEDs), and wherein the plurality of micro LEDs are included in at least one display included in the display device.

16. The method of claim 11, wherein determining the setting value of the at least one light includes:

identifying first brightness information corresponding to the at least one third sub area based on the at least one first attribute value;

identifying second brightness information corresponding to the at least one fourth sub area based on the at least one second attribute value;

determining a brightness value based on the first brightness information and the second brightness information; and determining the setting value of the at least one light based on the determined brightness value.

17. The method of claim 16, wherein the first brightness information includes information indicating a first brightness deviation, wherein the second brightness information includes information indicating a second brightness deviation, wherein the first brightness deviation is determined based on a difference between an average brightness value of all of the plurality of first sub areas and an average brightness value of the at least one third sub area, and wherein the second brightness deviation is determined based on a difference between an average brightness value of all of the plurality of second sub areas and an average brightness value of the at least one fourth sub area.

18. The method of claim 16, wherein the first brightness information includes information indicating an average brightness value of the at least one third sub area.

19. The method of claim 18, wherein determining the brightness value based on the first brightness information and the second brightness information includes determining the setting value of the at least one light based on an average brightness value of the at least one third sub area or a specified brightness value of the at least one light, and a difference value between the first brightness deviation and the second brightness deviation.

20. The method of claim 11, further comprising controlling the at least one light based on a specified setting value, based on a difference between the per-first sub area attribute value and the per-second sub area attribute value being within the specified range.

* * * * *